United States Patent
Kadosh et al.

(10) Patent No.: US 12,294,518 B2
(45) Date of Patent: May 6, 2025

(54) DYNAMIC FABRIC REACTION FOR OPTIMIZED COLLECTIVE COMMUNICATION

(71) Applicant: MELLANOX TECHNOLOGIES, LTD., Yokneam (IL)

(72) Inventors: Matty Kadosh, Hedera (IL); Omer Shabtai, Tel Aviv (IL); Khalid Manaa, Majd Alkrum (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 343 days.

(21) Appl. No.: 17/882,063

(22) Filed: Aug. 5, 2022

(65) Prior Publication Data
US 2024/0048489 A1    Feb. 8, 2024

(51) Int. Cl.
*G06F 15/173*    (2006.01)
*H04L 47/10*    (2022.01)
*H04L 47/12*    (2022.01)
*H04L 47/30*    (2022.01)
*H04L 47/36*    (2022.01)

(52) U.S. Cl.
CPC .............. *H04L 47/12* (2013.01); *H04L 47/29* (2013.01); *H04L 47/30* (2013.01); *H04L 47/36* (2013.01)

(58) Field of Classification Search
None
See application file for complete search history.

(56) References Cited

U.S. PATENT DOCUMENTS

| | | | |
|---|---|---|---|
| 2019/0324856 A1* | 10/2019 | Zhao | G06F 18/2148 |
| 2020/0213232 A1* | 7/2020 | Srivastava | H04L 47/12 |
| 2021/0235465 A1* | 7/2021 | Meylan | H04W 72/21 |
| 2023/0048559 A1* | 2/2023 | Karampatsis | H04W 72/569 |

* cited by examiner

*Primary Examiner* — Wing F Chan
*Assistant Examiner* — Andrew Woo
(74) *Attorney, Agent, or Firm* — Sheridan Ross P.C.

(57) ABSTRACT

A networking device and system are described, among other things. An illustrative system is disclosed to include a congestion controller that manages traffic across a network fabric using receiver-based packet scheduling and a networking device that employs the congestion controller for data flows qualified as a large data flow but bypasses the congestion controller for data flows qualified as a small data flow. For example, the networking device may receive information describing a data flow directed toward a processing network; determine, based on the information describing the data flow, a size of the data flow; determine the size of the data flow is below a predetermined flow threshold; and in response to determining that the size of the data flow is below a predetermined threshold, bypass the congestion controller.

21 Claims, 5 Drawing Sheets

DYNAMIC FABRIC REACTION FOR OPTIMIZED COLLECTIVE COMMUNICATION

FIELD OF THE DISCLOSURE

The present disclosure is generally directed to networking systems, methods, and devices and, in particular, toward facilitating collective communications in a network.

BACKGROUND

Networking devices such as routers, switches, Network Interface Controllers (NICs), etc. normally include a packet processing subsystem that manages the traversal of packets across a multi-layered network or protocol stack. For example, the network devices may be used in networking systems, like datacenters, for routing data between endpoints. In some cases, the network devices may use distributed computing for processing packets and routing the corresponding data between endpoints. A distributed computing system may be defined as a system whose components are located on different networking devices, which communicate and coordinate actions by passing messages to one another.

The communications between the networking devices may include all-to-all communications, where each networking device sends individual messages to every other networking device in the distributed computing system. The all-to-all communications may include collective communications that use collective libraries (e.g., NVIDIA Collective Communications Library (NCCL), Unified Collective Communication (UCC), Message Passing Interface (MPI), etc.). Communications that use the collective libraries may occur within a group of processes, and collective communications may occur over all of the processes in the group.

BRIEF SUMMARY

Embodiments of the present disclosure aim to improve latency in a communication network that implements all-to-all communications.

Example aspects of the present disclosure include a network device, comprising: a processor; and computer memory coupled to the processor, wherein the computer memory comprises instructions stored thereon that, when executed by the processor, enable the processor to: receive information describing a data flow directed toward a processing network; determine, based on the information describing the data flow, a size of the data flow; determine the size of the data flow is below a predetermined flow threshold; and in response to determining that the size of the data flow is below a predetermined threshold, bypass a congestion controller that manages data flows in the processing network.

Any of the aspects herein, wherein the instructions, when executed by the processor, further enable the processor to: determine a size of the processing network; determine the size of the processing network is above a predetermined network size threshold; and in response to determining that the size of the processing network is above the predetermined network size threshold, implement a time synchronization to divide the processing network into a plurality of smaller networks.

Any of the aspects herein, wherein bypassing the congestion controller comprises disabling an oversubscribe buffer of the congestion controller.

Any of the aspects herein, wherein bypassing the congestion controller comprises directing the data flow to a buffer other than the oversubscribe buffer.

Any of the aspects herein, wherein the predetermined flow threshold is defined by a number of operations to be performed.

Any of the aspects herein, wherein the predetermined flow threshold is defined by a percentage of operations to be performed having a message size less than a predetermined message size.

Any of the aspects herein, wherein the processing network comprises a plurality of processes belonging to a collective and wherein each process in the plurality of processes sends at least one message to every other process in the plurality of processes.

Any of the aspects herein, wherein the processing network employs all-to-all communication.

Any of the aspects herein, wherein bypassing the congestion controller comprises transmitting the data flow using sender-based packet scheduling.

Additional example aspects of the present disclosure include a system, comprising: a congestion controller that manages traffic across a network fabric using receiver-based packet scheduling; and a networking device that employs the congestion controller for data flows qualified as a large data flow but bypasses the congestion controller for data flows qualified as a small data flow.

Any of the aspects herein, wherein the networking device comprises a switch.

Any of the aspects herein, wherein the congestion controller is integrated into the networking device.

Any of the aspects herein, wherein data flows are qualified as the large data flow in response to the networking device determining that the data flow will result in more than a predetermined number of operations being performed during a workflow.

Any of the aspects herein, wherein the workflow comprises a Deep Learning Recommendation Model (DLRM).

Any of the aspects herein, wherein data flows are qualified as the small data flow in response to the networking device determining that the data flow will result in less than a predetermined number of operations being performed during a workflow.

Any of the aspects herein, wherein the network fabric employs all-to-all communication.

Any of the aspects herein, wherein data flows are sorted between the small data flow and large data flow based on a size of the data flow being compared to a predetermined flow threshold.

Any of the aspects herein, wherein the networking device bypasses the congestion controller by disabling an oversubscribe buffer of the congestion controller.

Any of the aspects herein, wherein the networking device qualifies the data flows as either the large data flow or the small data flow based on a Quality of Service (QoS) adaptation.

Any of the aspects herein, wherein the QoS adaptation is adjusted based on one or more of: changing allocated buffers, shared buffer properties, arbiter prioritization based on an indication of a collective, and arbiter prioritization based on a size of the collective.

Additional example aspects of the present disclosure include a method, comprising: receiving information describing a data flow directed toward a processing network; determining, based on the information describing the data flow, a size of the data flow; determining the size of the data flow qualifies the data flow as a small data flow; and in response to determining that the data flow qualifies as the small data flow, bypassing a congestion controller that manages data flows in the processing network.

Any of the aspects herein, further comprising: determining a size of the processing network; determining the size of the processing network is above a predetermined network size threshold; and in response to determining that the size of the processing network is above the predetermined network size threshold, implementing a time synchronization to divide the processing network into a plurality of smaller networks.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

It is to be appreciated that any feature described herein can be claimed in combination with any other feature(s) as described herein, regardless of whether the features come from the same described embodiment.

The details of one or more aspects of the disclosure are set forth in the accompanying drawings and the description below. Other features, objects, and advantages of the techniques described in this disclosure will be apparent from the description and drawings, and from the claims.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as X1-Xn, Y1-Ym, and Z1-Zo, the phrase is intended to refer to a single element selected from X, Y, and Z, a combination of elements selected from the same class (e.g., X1 and X2) as well as a combination of elements selected from two or more classes (e.g., Y1 and Zo).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

Numerous additional features and advantages are described herein and will be apparent to those skilled in the art upon consideration of the following Detailed Description and in view of the figures.

BRIEF DESCRIPTION OF THE SEVERAL VIEWS OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

The present disclosure is described in conjunction with the appended figures, which are not necessarily drawn to scale.

DETAILED DESCRIPTION

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

It will be appreciated from the following description, and for reasons of computational efficiency, that the components of the system can be arranged at any appropriate location within a distributed network of components without impacting the operation of the system.

Further, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a Printed Circuit Board (PCB), or the like.

The terms "determine," "calculate," and "compute," and variations thereof, as used herein, are used interchangeably and include any appropriate type of methodology, process, operation, or technique.

Various aspects of the present disclosure will be described herein with reference to drawings that may be schematic illustrations of idealized configurations.

Networking devices such as routers, switches, Network Interface Controllers (NICs), etc. normally include a packet processing subsystem that manages the traversal of packets across a multi-layered network or protocol stack. For example, the network devices may be used in networking systems, like datacenters, for routing data between endpoints.

Some computing systems may comprise thousands of nodes and/or networking devices interconnected by a communication network. In some cases, the network devices may use distributed computing for processing packets and routing the corresponding data between endpoints. A distributed computing system may be defined as a system whose components are located on different networking devices, which communicate and coordinate actions by passing messages to one another.

The communications between the networking devices may include all-to-all communications, where each networking device sends individual messages to every other networking device in the distributed computing system. The all-to-all communications may include collective communications that use collective libraries (e.g., NVIDIA Collective Communications Library (NCCL), Unified Collective Communication (UCC), Message Passing Interface (MPI), etc.). For example, the collective libraries may be standardized and portable message-passing standards that are used for a variety of distributed computing environments and network topologies. Communications that use the collective libraries may occur within a group of processes, and collective communications may occur over all of the processes in the group.

A processing network may employ all-to-all communications for processing packets, routing data between endpoints, training models, etc. In some examples, the processing network may comprise a plurality of processes belonging to a collective (e.g., collective library, collective communications, etc.), and each process in the plurality of processes may send at least one message to every other process in the plurality of processes (e.g., all-to-all communications). The processing network may include or may be referred to as a network fabric. For example, a network fabric may comprise a number of meshed connections between a plurality of network devices (e.g., switches, routers, etc.), and the mesh of connections (e.g., network links) may be referred to as the network fabric. The network fabric may have inherent redundancy, as multiple switching resources are spread across a given data center, thus heling assure better application availability. Additionally, the network fabric may enable all-to-all communications and any-to-any connectivity (e.g., connectivity between any two network devices) with a predictable capacity and lower latency.

In some examples, the processing network may enable training and developing artificial intelligence (AI) models. For example, the processing network may be used to train deep learning recommendation models (DLRM) (e.g., recommendation systems that are built to predict what users might like or may be more inclined to interact with) and/or other types of AI models. DLRM may comprise a model that has low compute requirements and high network loads. DLRM may comprise large-sized models and may employ parallel computing (e.g., a type of computation in which many calculations or processes are carried out simultaneously, such as data parallelism and/or model parallelism) for processing or training the models. In some examples, DLRM may use all-to-all communications for training the model and for employing the parallel computing.

However, the all-to-all communications may consume a majority of time for training or using DLRM. For example, communication among network devices (e.g., processors, General Processing Units (GPUs), etc.) is a main challenge when training distributed deep learning models (e.g., DLRM) in a large-scale environment (e.g., processing network, across a network fabric, etc.). In some examples, a latency of exchanging information for training the models (e.g., gradients) over all the network devices (e.g., using all-to-all communication) may present a bottleneck in data-parallel synchronized distributed deep learning). Additionally, in some examples, a minority of all-to-all operations for training or using a DLRM may be larger in size (e.g., above 300 kilobytes (kB) per message communicated or transferred) but may represent a majority of traffic for the all-to-all communications (e.g., in terms of a total number of bytes communicated or transferred).

Accordingly, to reduce latency associated with communications (e.g., all-to-all communications) used for training deep learning distributed models (e.g., DLRM), devices, systems, and methods are provided herein that optimize a processing network (e.g., fabric) for short flow communications. In some examples, the short flow communications may correspond to communications with a fewer number of round-trip time (RTT) packets (e.g., packets that require an acknowledgement of receipt at a receiving device). Accordingly, a networking device may determine a size of a data flow directed towards the processing network, and if the size of the data flow is determined to be below a predetermined threshold, the networking device may bypass a congestion controller that manages data flows in the processing network, thereby reducing latency. Additionally, in some examples, the networking device may determine whether a size of the processing network (e.g., bandwidth of the processing network) is above a predetermined network size threshold, and if so, the networking device may implement a time synchronization technique (e.g., time-division multiplexing (TDM)) to divide the processing network into a plurality of smaller networks.

In some embodiments, bypassing the congestion controller may include disabling an oversubscribe buffer of the congestion controller, directing the data flow to a buffer other than the congestion controller, transmitting the data flow using sender-based packet scheduling, or a combination thereof. Additionally, in some embodiments, the predetermined flow threshold may be defined by a number of operations to be performed for the data flow, by a percentage of operations to be performed having a message size less than a predetermined message size, or a combination thereof. Additionally or alternatively, the networking device may determine whether the data flow qualifies as a small data flow or a large data flow based on a Quality of Service (QoS) adaptation. For example, the QoS adaptation may be adjusted based on or more of changing allocated buffers, shared buffer properties, arbiter prioritization based on an indication of a collective, and arbiter prioritization based on a size of the collective.

Adjustments based on shared buffer properties are possible. Shared buffer properties or shared buffer parameters can be used to configure how much of a total shared buffer a port is allocated. Shared buffer properties or shared buffer parameters can also be used to configure how fast a port consumes its allocated portion of the shared buffer. Usually, a single port is restricted in this sense. With respect to all-to-all communications, with a known total size being smaller than the shared buffer, it can be assumed that the shared buffer won't overflow. In this situation, embodiments of the present disclosure allow for a single port to consume almost all of the shared buffer relatively quickly, and then disable the congestion notification (e.g., an Explicit Congestion Notification (ECN) mark), which allows the all-to-all communication to quickly finish without delay or slowing down. In other words, applying congestion control processes described herein in combination with a shared buffer provides additional benefits not currently available in existing networks.

Embodiments of the present disclosure provide technical solutions to one or more of the above-described problems of (1) higher latency for all-to-all communications that arises based on larger-sized data flows, (2) increased flow completion time (FCT) for the all-to-all communications, and (3) training deep learning models using all-to-all communications. While some embodiments will be described with reference to examples of all-to-all communications, it should be appreciated that embodiments of the present disclosure can be applied to other collectives. In other words, embodiments of the present disclosure should not be construed as being limited to all-to-all communications. Instead, embodiments of the present disclosure may be utilized in other collectives such as, but not limited to, alltoall, alltoallv, allgather, allgatherv, allreduce, variants thereof, etc.

Figure 1:
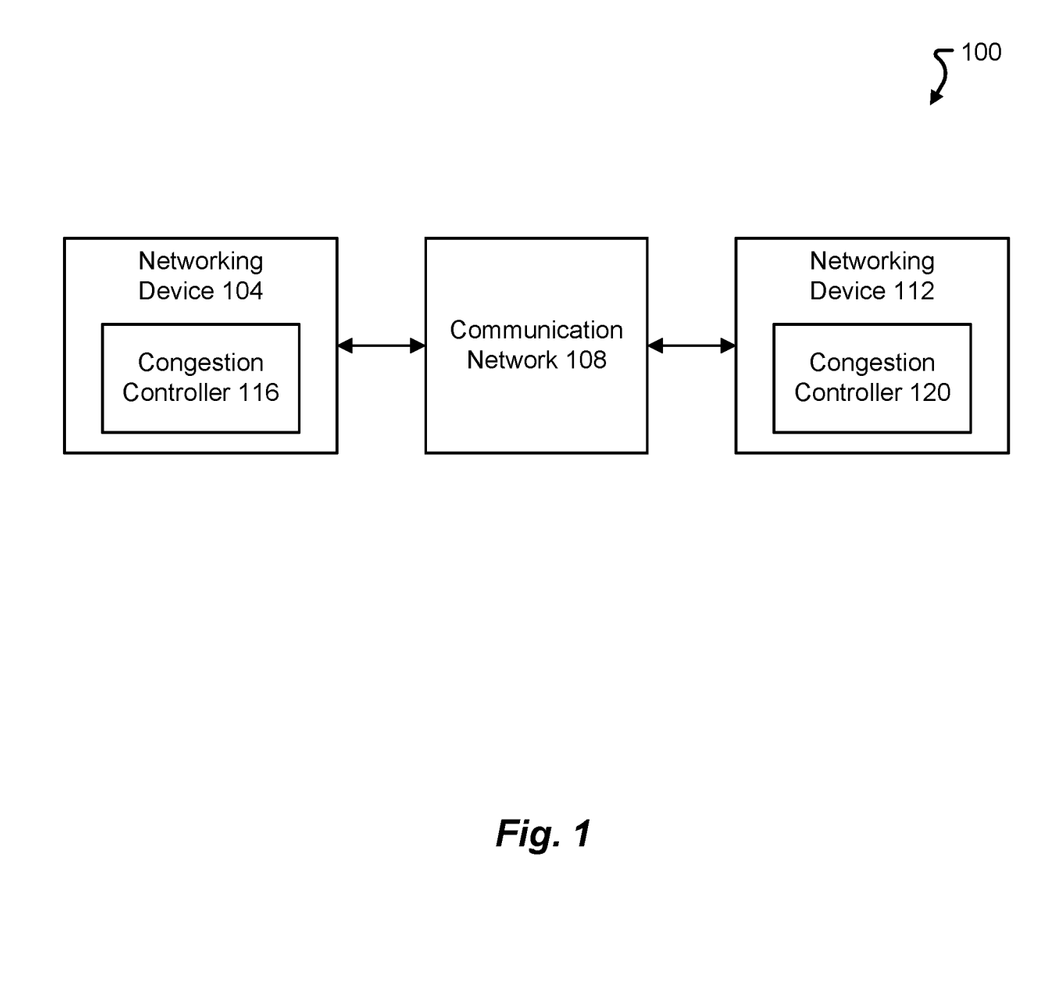
FIG. 1 illustrates a block diagram of a networking system according to at least one example embodiment of the present disclosure.

FIG. 1 illustrates a system 100 according to at least one example embodiment. The system 100 includes a networking device 104, a communication network 108, and a networking device 112. In at least one example embodiment, networking devices 104 and 112 may correspond a network switch (e.g., an Ethernet switch), a collection of network switches, a network interface controller (NIC), or any other suitable device used to control the flow of data between devices connected to communication network 108. Each networking device 104 and 112 may be connected to one or more of Personal Computer (PC), a laptop, a tablet, a smartphone, a server, a collection of servers, or the like. In one specific, but non-limiting example, each networking device 104 and 112 includes multiple network switches in a fixed configuration or in a modular configuration.

Examples of the communication network 108 that may be used to connect the networking devices 104 and 112 include an Internet Protocol (IP) network, an Ethernet network, an InfiniBand (IB) network, a Fibre Channel network, the Internet, a cellular communication network, a wireless communication network, combinations thereof (e.g., Fibre Channel over Ethernet), variants thereof, and/or the like. In one specific, but non-limiting example, the communication network 108 is a network that enables communication between the networking devices 104 and 112 using Ethernet technology. In one specific, but non-limiting example, the networking devices 104 and 112 correspond to director switches that may have a modular configuration. As discussed in more detail below, a network switch (e.g., a director switch) according to inventive concepts may implement multiple layers of a network topology as field replaceable units (FRUs) or customer replaceable units (CRUs) within a single chassis.

Although not explicitly shown, the networking device 104 and/or the networking device 112 may include storage devices and/or processing circuitry for carrying out computing tasks, for example, tasks associated with controlling the flow of data within each networking device 104 and 112 and/or over the communication network 108. Such processing circuitry may comprise software, hardware, or a combination thereof. For example, the processing circuitry may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random-Access Memory (RAM), Read-Only Memory (ROM), variants thereof, combinations thereof, or the like. In some embodiments, the memory and processor may be integrated into a common device (e.g., a microprocessor may include integrated memory). Additionally or alternatively, the processing circuitry may comprise hardware, such as an application specific integrated circuit (ASIC). Other non-limiting examples of the processing circuitry include an Integrated Circuit (IC) chip, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry may be provided on a PCB or collection of PCBs. It should be appreciated that any appropriate type of electrical component or collection of electrical components may be suitable for inclusion in the processing circuitry.

In addition, although not explicitly shown, it should be appreciated that the networking devices 104 and 112 include one or more communication interfaces for facilitating wired and/or wireless communication between one another and other unillustrated elements of the system 100.

In some embodiments, the networking devices 104 and 112 may include congestion controllers 116 and 120, respectively. For example, the congestion controllers 116, 120 may be integrated into the networking devices 104, 112. The congestion controllers 116 and 120 may be used, in part, to manage traffic across the communication network 108 and through the networking devices 104 and 112. For example, the congestion controllers 116, 120 may manage traffic across a network fabric (e.g., a processing network comprised of the networking devices 104, 112 and other components/devices of the system 100) using receiver-based packet scheduling.

As described herein, the networking devices 104, 112 may employ the congestion controllers 116, 120 for data flows that qualify as large data flows but may bypass the congestion controllers 116, 120 for data flows that qualify as small data flows. For example, a data flow may qualify as a large data flow in response to the networking devices 104, 112 determining the data flow will result in more than a predetermined number of operations being performed during a workflow. Additionally or alternatively, a data flow may qualify as a small data flow in response to the networking devices 104, 112 determining the data flow will result in less than the predetermined number of operations being performed during the workflow. In some embodiments, the workflow may comprise a DLRM or a different deep learning distributed model.

In some embodiments, the data flows may be sorted between small data flows and large data flows based on a size of the data flow being compared to a predetermined flow threshold. Additionally or alternatively, the networking devices 104, 112 may qualify the data flows as either large data flows or small data flows based on a QoS adaptation. In some examples, the QoS adaptation may be adjusted based on one or more of: changing allocated buffers, shared buffer properties, arbiter prioritization based on an indication of a collective, and arbiter prioritization based on a size of the collective.

In some embodiments, the networking devices 104, 112 may bypass the congestion controllers 116, 120 for data flows that qualify as small data flows by disabling an oversubscribe buffer (e.g., a buffer that prevents networking devices from being oversubscribed or limits a number of operations that the networking devices can perform) of the congestion controllers 116 and 120, directing the data flow to a buffer other than the congestion controllers 116 and 120, transmitting the data flow using sender-based packet scheduling, or a combination thereof.

Figure 2:
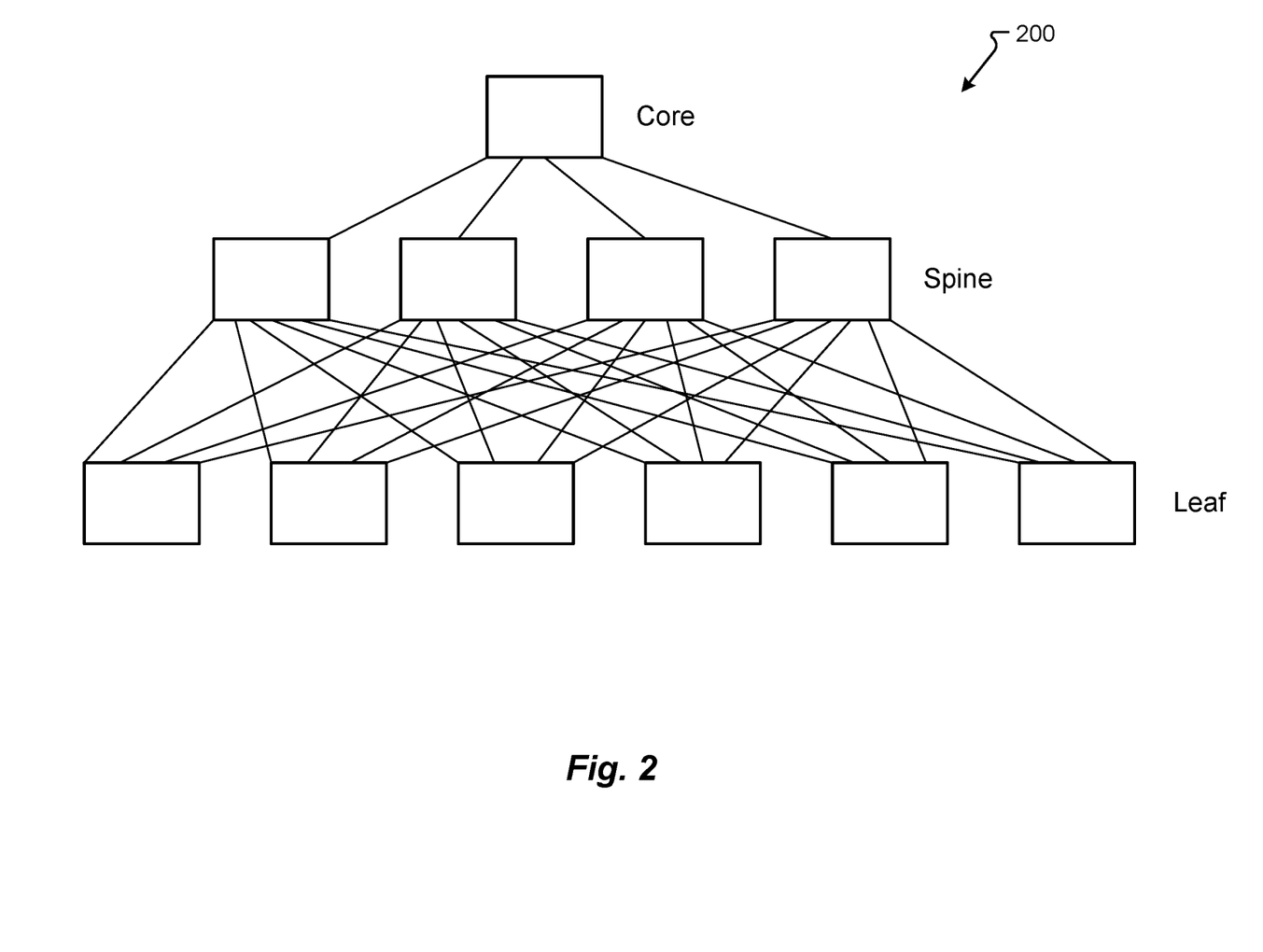
FIG. 2 illustrates a networking topology according to at least one example embodiment of the present disclosure.

FIG. 2 illustrates a networking topology 200 according to at least one example embodiment. The networking topology 200 is a three-tier topology with core, spine (or aggregation), and leaf (or access) layers. Each box of each layer represents a collection of network switches that is repeated for that layer. Although not explicitly shown, endpoints that comprise servers and/or user terminals may be connected to the leaf layer. Here, it should be appreciated that example embodiments are not limited to the networking topology 200, and inventive concepts may be applied to other suitable network topologies (e.g., a two-tier topology with spine and leaf layers, dragonfly network topologies, etc.).

As described and used herein, the networking topology 200 may be used as a processing network and/or a network fabric, or the networking topology 200 may be referred to as a processing network and/or a network fabric. For example, the networking topology 200 may be used for enabling, performing, or processing a workflow. In some embodiments, the workflow may comprise a DLRM or a different deep learning distributed model and/or the training of the DLRM or other deep learning distributed model. Additionally, the processing network, network fabric, and/or workflow may employ all-to-all communication. For example, the processing network, network fabric, and/or workflow may comprise a plurality of processes belonging to a collective (e.g., collective library, collective communications, etc.), and each process in the plurality of processes may send at least one message to every other process in the plurality of processes (e.g., all-to-all communications).

Figure 3:
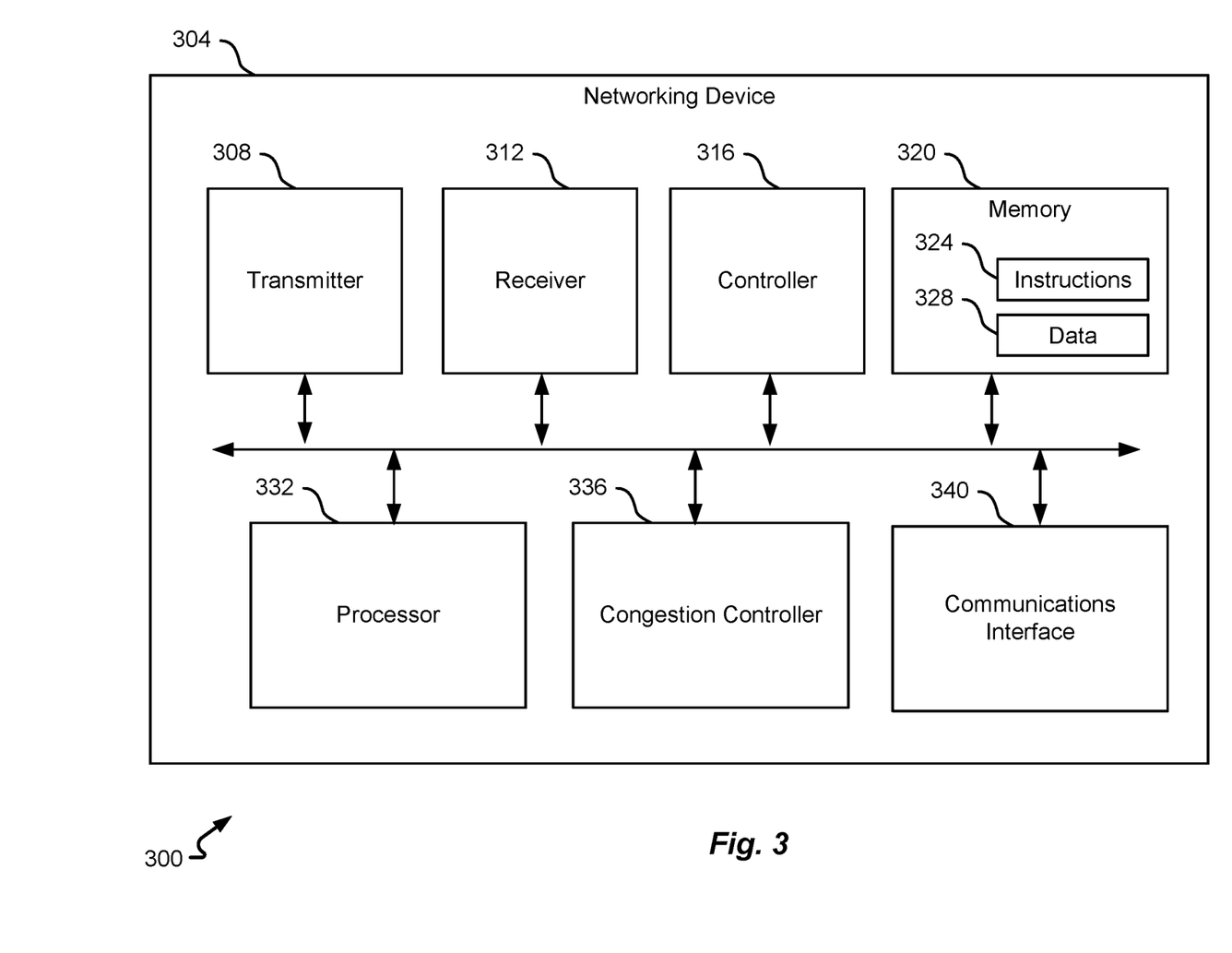
FIG. 3 illustrates an example of system according to at least one example embodiment of the present disclosure.

FIG. 3 illustrates an example of a system 300 configured for parsing and/or analyzing a packet. The system 300 may include a networking device 304. The networking device 304 may include aspects of a client device or a server described herein. In some cases, the networking device 304 may be referred to as a computing resource. The networking device 304 may perform any or all of the operations described in the present disclosure.

The networking device 304 may include a transmitter 308, a receiver 312, a controller 316, a memory 320, a processor 332, a parser 336, and a communications interface 340. In some examples, components of the networking device 304 (e.g., transmitter 308, receiver 312, controller 316, memory 320, processor 332, parser 336, communications interface 340, etc.) may communicate over a system bus (e.g., PCIe bus, control busses, address busses, data busses, etc.) included in the networking device 304.

The transmitter 308 and the receiver 312 may support the transmission and reception of signals to and from the networking device 304. In some aspects, the transmitter 308 and the receiver 312 may support the transmission and reception of signals within the networking device 304. The transmitter 308 and receiver 312 may be collectively referred to as a transceiver. An antenna may be electrically coupled to the transceiver. The networking device 304 may also include (not shown) multiple transmitters 308, multiple receivers 312, multiple transceivers and/or multiple antennas.

The controller 316 may be located on a same chip (e.g., ASIC chip) as the transmitter 308 and/or the receiver 312. In some cases, the controller 316 may be located on a different chip as the transmitter 308 and/or the receiver 312. In some examples, the controller 316 may be located on a chip of or on a chip of another networking device 304. The controller 316 may instruct the transmitter 308 to use one algorithms associated with implementing aspects of the present disclosure described herein. In some examples, the controller 316 may be a programmed microprocessor or microcontroller. In some aspects, the controller 316 may include one or more CPUs, memory, and programmable I/O peripherals.

The memory 320 may be any electronic component capable of storing electronic information. The memory 320 may be, for example, RAM, ROM, magnetic disk storage media, optical storage media, flash memory devices in RAM, on-board memory included with the processor, EPROM memory, EEPROM memory, registers, and so forth, including combinations thereof.

The memory 320 may include instructions 324 (computer readable code) and data 328 stored thereon. The instructions 324 may be executable by the processor 332 to implement the methods disclosed herein. In some aspects, execution of the instructions 324 may involve one or more portions of the data 328. In some examples, when the processor 332 executes the instructions 324, various portions of the instructions 324 and/or the data 328 may be loaded onto the processor 332.

The processor 332 may correspond to one or multiple computer processing devices. For example, the processor 332 may include a silicon chip, such as an FPGA, an ASIC, any other type of IC chip, a collection of IC chips, or the like. In some aspects, the processors may include a microprocessor, a CPU, a GPU, a graphics processing unit, or plurality of microprocessors configured to execute instructions sets stored in a corresponding memory (e.g., memory 320 of the networking device 304). For example, upon executing the instruction sets stored in memory 320, the processor 332 may enable or perform one or more functions of the networking device 304. In some examples, a combination of processors 332 may be implemented in the networking device 304.

The congestion controller 336 may represent an example of the congestion controller 116, 120 as described herein and with reference to FIG. 1. For example, the congestion controller 336 may be used to manage traffic across a network fabric (e.g., processing network, such as the networking topology 200 as described with reference to FIG. 2) using receiver-based packet scheduling at the networking device 304. In some examples, as described herein and to reduce latency for performing a given workflow (e.g., training or using a DLRM or other deep learning distributed model), the networking device 304 may employ the congestion controller 336 for data flows qualified as a large data flow but bypasses the congestion controller 336 for data flows qualified as a small data flow. In some embodiments, bypassing the congestion controller 336 may comprise the networking device 304 disabling an oversubscribe buffer of the congestion controller 336, directing the data flow to a buffer other than the congestion controller 336, transmitting the data flow using sender-based packet scheduling, or a combination thereof. Additionally, the congestion controller 336 may be implemented in the processor 332 of the networking device 304 or otherwise integrated into the networking device 304.

The communications interface 340 may support interactions (e.g., via a physical or virtual interface) between a user and the networking device 304.

Figure 4:
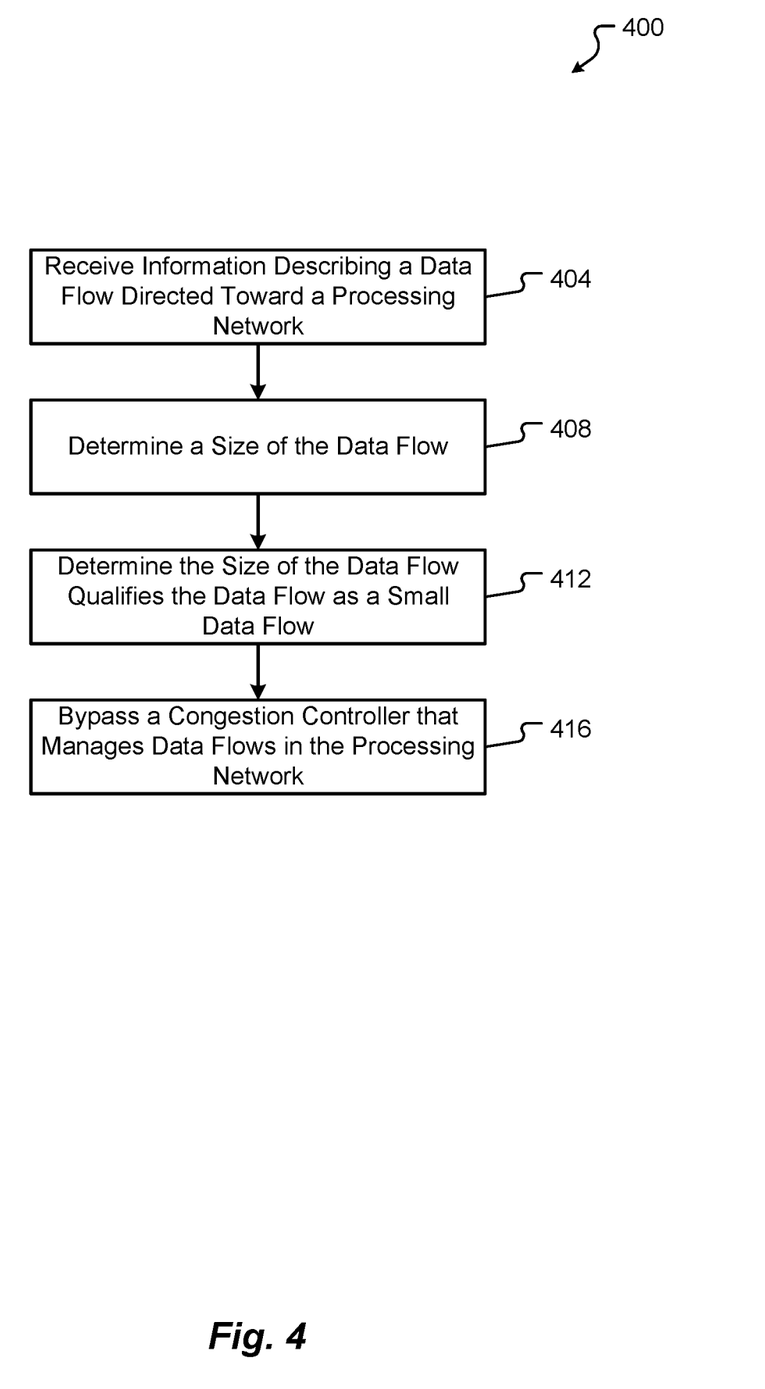
FIG. 4 illustrates a flowchart according to at least one embodiment of the present disclosure.

FIG. 4 depicts a method 400 that may be used, for example, to optimize a workflow at a networking device by bypassing a congestion controller for smaller sized data flows.

The method 400 (and/or one or more steps thereof) may be carried out or otherwise performed, for example, by at least one processor. The at least one processor may be the same as or similar to the processor(s) of the networking device 104, 112, or 304 described above. The at least one processor may be part of the networking device 304 or part of a control unit in communication with the networking device 104, 112, or 304. A processor other than any processor described herein may also be used to execute the method 400. The at least one processor may perform the method 400 by executing elements stored in a memory (such as a memory in the networking device 104, 112, or 304 as described above or a control unit). The elements stored in the memory and executed by the processor may cause the processor to execute one or more steps of a function as shown in method 400. One or more portions of a method 400 may be performed by the processor executing any of the contents of memory, such as analyze one or more packets received at the networking device 104, 112, or 304 and/or any associated operations as described herein.

The method 400 comprises receiving information describing a data flow directed toward a processing network (step 404). For example, the data flow may be part of a workflow that employs all-to-all communication, where the processing network (e.g., network fabric) supports or also employs all-to-all communication. In some embodiments, the workflow may comprise DLRM or may include training or using DLRM. Additionally, the processing network may comprise a plurality of processes belonging to a collective (e.g., processes from a collective library, such as NCCL, UCC, MPI, etc.), where each process in the plurality of processes sends at least one message to every other process in the plurality of processes (e.g., all-to-all communication).

The method 400 also comprises determining, based on the information describing the data flow, a size of the data flow (step 408). For example, the information describing the data flow may include a number of operations to be performed for the data flow (e.g., per transaction in the data flow), a message size of one or more messages in the data flow, or a combination thereof.

The method 400 also comprises determining the size of the data flow qualifies the data flow as a small data flow (step 412). For example, the size of the data flow may be determined to qualify the data flow as a small data flow based on determining the size of the data flow is below a predetermined flow threshold. In some embodiments, the predetermined flow threshold may be defined by a number of operations to be performed, by a percentage of operations to be performed having a message size less than a predetermined message size, or a combination thereof. Additionally or alternatively, data flows may qualify as either large data flows or small data flows based on a QoS adaptation. In some embodiments, the QoS adaptation may be adjusted based on one or more of: changing allocated buffers, shared buffer properties, arbiter prioritization based on an indication of a collective, and arbiter prioritization based on a size of the collective.

In some embodiments, data flows may qualify as small data flows in response to determining that the data flows will result in less than a predetermined number of operations being performed during the workflow. Additionally or alternatively, data flows may qualify as large data flows in response to determining that the data flows will result in more than a predetermined number of operations being performed during a workflow.

The method 400 also comprises bypassing a congestion controller that manages data flows in the processing network in response to determining that the data flow qualifies as the small data flow (step 416). For example, bypassing the congestion controller may comprise disabling an oversubscribe buffer of the congestion controller, directing the data flow to a buffer other than the oversubscribe buffer, transmitting the data flow using sender-based packet scheduling, or a combination thereof.

The present disclosure encompasses embodiments of the method 400 that comprise more or fewer steps than those described above, and/or one or more steps that are different than the steps described above.

Figure 5:
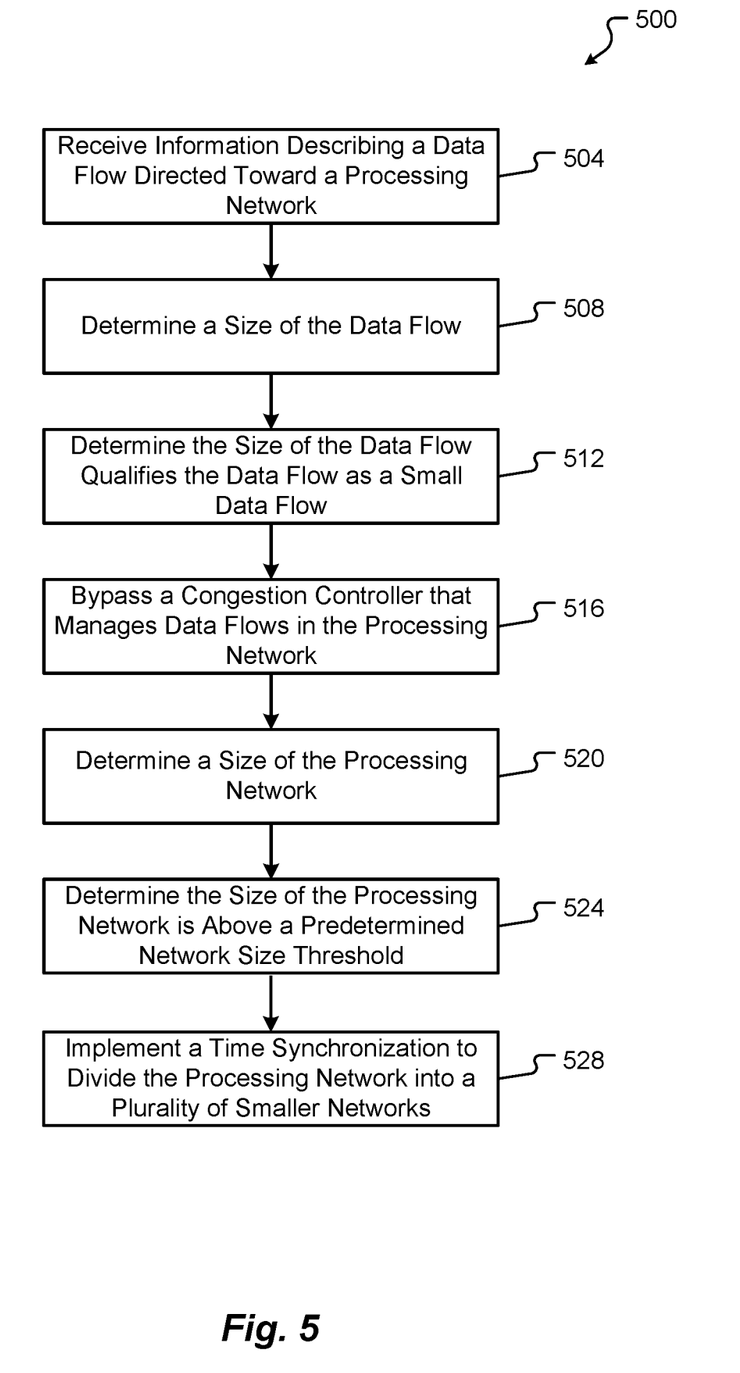
FIG. 5 illustrates a flowchart according to at least one embodiment of the present disclosure.

FIG. 5 depicts a method 500 that may be used, for example, to further optimize a workflow at a networking device when a size of a processing network (e.g., network fabric) is above a predetermined network size threshold.

The method 500 (and/or one or more steps thereof) may be carried out or otherwise performed, for example, by at least one processor. The at least one processor may be the same as or similar to the processor(s) of the networking device 104, 112, or 304 described above. The at least one processor may be part of the networking device 304 or part of a control unit in communication with the networking device 104, 112, or 304. A processor other than any processor described herein may also be used to execute the method 500. The at least one processor may perform the method 500 by executing elements stored in a memory (such as a memory in the networking device 104, 112, or 304 as described above or a control unit). The elements stored in the memory and executed by the processor may cause the processor to execute one or more steps of a function as shown in method 500. One or more portions of a method 500 may be performed by the processor executing any of the contents of memory, such as analyze one or more packets received at the networking device 104, 112, or 304 and/or any associated operations as described herein.

The method 500 may implement aspects of the method 400 as described with reference to FIG. 4 For example, the method 500 comprises receiving information describing a data flow directed toward a processing network (step 504); determining, based on the information describing the data flow, a size of the data flow (step 508); determining the size of the data flow qualifies the data flow as a small data flow (step 512); and in response to determining that the data flow qualifies as the small data flow, bypassing a congestion controller that manages data flows in the processing network (step 516); which may correspond to steps 404, 408, 412, and 516, respectively as described with reference to FIG. 4.

In some examples, the method 500 also comprises determining a size of the processing network (step 520). For example, the size of the processing network may include a bandwidth of the processing network.

The method 500 also comprises determining the size of the processing network is above a predetermined network size threshold (step 524). For example, in some embodiments, the processing network may comprise a network fabric size that is large and above the predetermined network size threshold (e.g., a large number of connected network devices to support a large bandwidth).

The method 500 also comprises implementing a time synchronization to divide the processing network into a plurality of smaller networks in response to determining that the size of the processing network is above the predetermined network size threshold (step 528). For example, the time synchronization may comprise a TDM technique to divide the processing network (e.g., into subsets of networking devices of the processing network for processing the data flow or different operations of the data flow).

The present disclosure encompasses embodiments of the method 500 that comprise more or fewer steps than those described above, and/or one or more steps that are different than the steps described above.

As noted above, the present disclosure encompasses methods with fewer than all of the steps identified in FIGS. 4 and 5 (and the corresponding description of the methods 400 and 500), as well as methods that include additional steps beyond those identified in FIGS. 4 and 5 (and the corresponding description of the methods 400 and 500). The present disclosure also encompasses methods that comprise one or more steps from one method described herein, and one or more steps from another method described herein. Any correlation described herein may be or comprise a registration or any other correlation.

Any of the steps, functions, and operations discussed herein can be performed continuously and automatically.

The exemplary systems and methods of this disclosure have been described in relation to a dual connect switch module. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others.

References in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in conjunction with one embodiment, it is submitted that the description of such feature, structure, or characteristic may apply to any other embodiment unless so stated and/or except as will be readily apparent to one skilled in the art from the description. The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B, and C together. When each one of A, B, and C in the above expressions refers to an element, such as X, Y, and Z, or a class of elements, such as X1-Xn, Y1-Ym, and Z1-Zo, the phrase is intended to refer to a single element selected from X, Y, and Z, a combination of elements selected from the same class (e.g., X1 and X2) as well as a combination of elements selected from two or more classes (e.g., Y1 and Zo).

What is claimed is:

1. A networking device, comprising:
a processor; and
computer memory coupled to the processor, wherein the computer memory comprises instructions stored thereon that, when executed by the processor, enable the processor to:
receive information describing a data flow directed toward a processing network;
determine, based on the information describing the data flow, a size of the data flow;
determine the size of the data flow is below a predetermined flow threshold; and
in response to determining that the size of the data flow is below the predetermined flow threshold, bypass a congestion controller that manages data flows in the processing network by disabling an oversubscribe buffer of the congestion controller.

2. The networking device of claim 1, wherein the instructions, when executed by the processor, further enable the processor to:
determine a size of the processing network;
determine the size of the processing network is above a predetermined network size threshold; and
in response to determining that the size of the processing network is above the predetermined network size threshold, implement a time-division multiplexing (TDM) to divide the processing network into a plurality of smaller networks.

3. The networking device of claim 2, wherein bypassing the congestion controller comprises directing the data flow to a buffer other than the disabled oversubscribe buffer.

4. The networking device of claim 1, wherein the predetermined flow threshold is defined by a number of operations to be performed.

5. The networking device of claim 1, wherein the predetermined flow threshold is defined by a percentage of operations to be performed having a message size less than a predetermined message size.

6. The networking device of claim 1, wherein the processing network comprises a plurality of processes belonging to a collective and wherein each process in the plurality of processes sends at least one message to every other process in the plurality of processes.

7. The networking device of claim 1, wherein the processing network employs all-to-all communication.

8. The networking device of claim 1, wherein bypassing the congestion controller comprises transmitting the data flow using sender-based packet scheduling.

9. A system, comprising:
a processor; and
computer memory coupled to the processor, wherein the computer memory comprises instructions stored thereon that are executable by the processor, wherein the instructions include:
a congestion controller that manages traffic across a network fabric using receiver-based packet scheduling; and
a networking device that employs the congestion controller for data flows qualified as a large data flow but bypasses the congestion controller for data flows qualified as a small data flow, wherein the networking device bypasses the congestion controller by disabling an oversubscribe buffer of the congestion controller.

10. The system of claim 9, wherein the networking device comprises a switch.

11. The system of claim 9, wherein the congestion controller is integrated into the networking device.

12. The system of claim 9, wherein data flows are qualified as the large data flow in response to the networking device determining that the large data flow will result in more than a predetermined number of operations being performed during a workflow.

13. The system of claim 12, wherein the workflow comprises a Deep Learning Recommendation Model (DLRM).

14. The system of claim 9, wherein the data flows are qualified as the small data flow in response to the networking device determining that the small data flow will result in less than a predetermined number of operations being performed during a workflow.

15. The system of claim 9, wherein the network fabric employs all-to-all communication.

16. The system of claim 9, wherein data flows are sorted between the small data flow and large data flow based on a size of the data flows being compared to a predetermined flow threshold.

17. The system of claim 9, wherein the networking device qualifies the data flows as either the large data flow or the small data flow based on a Quality of Service (QOS) adaptation.

18. The system of claim 17, wherein the QoS adaptation is adjusted based on one or more of: changing allocated buffers, shared buffer properties, arbiter prioritization based on an indication of a collective, and arbiter prioritization based on a size of the collective.

19. The system of claim 17, wherein the QoS adaptation is adjusted based on shared buffer properties and wherein the shared buffer properties comprise at least one of an amount of a shared buffer allocated to a port and a speed with which the port can consume the shared buffer allocated thereto.

20. A method, comprising:
receiving information describing a data flow directed toward a processing network;
determining, based on the received information describing the data flow, a size of the data flow;
determining the size of the data flow qualifies the data flow as a small data flow; and
in response to determining that the data flow qualifies as the small data flow, bypassing a congestion controller that manages data flows in the processing network by disabling an oversubscribe buffer of the congestion controller.

21. The method of claim 20, further comprising:
determining a size of the processing network;
determining the size of the processing network is above a predetermined network size threshold; and
in response to determining that the size of the processing network is above the predetermined network size threshold, implementing a time-division multiplexing (TDM) to divide the processing network into a plurality of smaller networks.

* * * * *